(12) United States Patent
Ferguson

(10) Patent No.: US 7,165,461 B2
(45) Date of Patent: Jan. 23, 2007

(54) PRESSURE GAUGE HAVING DUAL FUNCTION MOVEMENT PLATE

(75) Inventor: Walter James Ferguson, Waterbury, CT (US)

(73) Assignee: Ashcroft, Inc., Stratford, CT (US)

( * ) Notice: Subject to any disclaimer, the term of this patent is extended or adjusted under 35 U.S.C. 154(b) by 0 days.

(21) Appl. No.: 10/400,330

(22) Filed: Mar. 27, 2003

(65) Prior Publication Data

US 2004/0187590 A1 Sep. 30, 2004

(51) Int. Cl.
*G01L 7/10* (2006.01)

(52) U.S. Cl. .......................................... 73/732; 73/741

(58) Field of Classification Search ............ 73/700–756
See application file for complete search history.

(56) References Cited

U.S. PATENT DOCUMENTS

| 2,117,287 | A | 5/1938 | Bloch |
| 2,457,286 | A | 12/1948 | Tollefsen et al. |
| 3,283,581 | A | 11/1966 | Du Bois et al. |
| 3,459,043 | A | 8/1969 | Young |
| 3,581,566 | A | 6/1971 | Goff et al. |
| 3,742,233 | A | 6/1973 | Gorgens et al. |
| 3,878,721 | A | 4/1975 | Gunther |

(Continued)

FOREIGN PATENT DOCUMENTS

| DE | 2341988 | A | 7/1974 |
| DE | 2739054 | | 3/1979 |
| DE | 2739054 | A | 3/1979 |
| FR | 2 192 704 | A | 2/1974 |
| FR | 2 192 704 | | 2/1974 |
| FR | 2 284 869 | A | 4/1976 |
| FR | 2 284 869 | | 4/1976 |
| GB | 1310030 | | 3/1973 |
| GB | 1 451 899 | A | 10/1976 |
| GB | 2 345 546 | | 7/2000 |
| JP | 6093325 | A | 5/1985 |
| JP | 60093325 | | 5/1985 |
| JP | 04015191 | | 1/1992 |
| JP | 2000162913 | A | 6/2000 |
| JP | 2001255107 | | 9/2001 |
| SU | 494623 | A | 3/1976 |
| WO | WO 2004/053450 | A | 6/2004 |

OTHER PUBLICATIONS

Patent Cooperation Treaty, International Search Report, International Application No. PCT/US2004/004543, Jul. 29, 2004.
PCT International Search Report for PCT/US03/38041, mailing date May 13, 2004, 4 pages.
PCT International Search Report, PCT/US2004/004484, Jul. 2004, pp. 1–4.
Accutech, Wireless Instrumentation, Pressure Field Unit, 2 pages, 2003.
Accutech, Wireless Instrumentation, Base Radio, 2 pages, 2003.
Innovative Sensor Solutions, LTD., DataStik Wireless Tank Gauging, Proven Magnetostrictive Level Sensing Performance: Now Wireless and Battery–Powered, 2 pages.

*Primary Examiner*—William Oen
*Assistant Examiner*—Jermaine Jenkins
(74) *Attorney, Agent, or Firm*—McCarter & English, LLP

(57) ABSTRACT

A pressure gauge comprising a stem having an inlet at which pressure is sensed. A Bourdon tube is coupled to the stem and is displaceable in response to pressure changes at the inlet. A movement comprising a movement plate conducts displacement of the Bourdon tube to a pointer shaft. A circuit board comprising an inductor is fixed relative to the stem. The movement plate comprises an integral flag connecting the movement to the Bourdon tube and an integral inductive target operatively positioned relative to the inductor.

5 Claims, 3 Drawing Sheets

U.S. PATENT DOCUMENTS

| | | |
|---|---|---|
| 3,973,191 A | 8/1976 | Zabler |
| 3,975,706 A | 8/1976 | Kato |
| 4,055,085 A | 10/1977 | Wetterhorn |
| 4,075,551 A | 2/1978 | Zabler |
| 4,237,445 A | 12/1980 | Crossman |
| 4,396,301 A | 8/1983 | Stucki |
| 4,460,869 A | 7/1984 | Buser et al. |
| 4,502,334 A | 3/1985 | Gorgens et al. |
| 4,598,260 A | 7/1986 | Carr |
| 4,671,116 A * | 6/1987 | Glennon et al. .............. 73/728 |
| 4,745,811 A | 5/1988 | Gray |
| 4,833,919 A | 5/1989 | Saito et al. |
| 5,022,425 A * | 6/1991 | Prescott et al. .............. 137/82 |
| 5,243,860 A | 9/1993 | Habart |
| 5,255,981 A | 10/1993 | Schiessle et al. |
| 5,257,639 A * | 11/1993 | Prescott et al. .............. 137/82 |
| 5,322,119 A | 6/1994 | Kadwell et al. |
| 5,521,494 A | 5/1996 | Hore et al. |
| 5,742,161 A | 4/1998 | Karte |
| 5,806,761 A | 9/1998 | Enoki et al. |
| 5,829,148 A | 11/1998 | Eaton |
| 5,944,179 A | 8/1999 | Walker |
| 5,973,267 A | 10/1999 | Huang |
| 5,994,895 A | 11/1999 | Bolte et al. |
| 6,051,293 A | 4/2000 | Weilandt |
| H1854 H | 7/2000 | Boston et al. |
| 6,114,849 A | 9/2000 | Price et al. |
| 6,119,525 A * | 9/2000 | Hamma ....................... 73/739 |
| 6,369,715 B1 | 4/2002 | Bennett, Jr. et al. |
| 6,384,596 B1 | 5/2002 | Beyer |
| 6,523,427 B1 | 2/2003 | Ferguson |
| 6,604,057 B1 | 8/2003 | Eden et al. |
| 6,636,793 B1 | 10/2003 | Garber et al. |
| 6,812,693 B1 | 11/2004 | Heinrich et al. |
| 2001/0045892 A1 | 11/2001 | Thomas et al. |
| 2002/0079726 A1 | 6/2002 | Garber et al. |
| 2003/0020466 A1 | 1/2003 | Lewis |
| 2004/0119459 A1 | 6/2004 | Takashi |
| 2004/0129095 A1 | 7/2004 | Churchill et al. |
| 2005/0093537 A1 | 5/2005 | Townsend et al. |
| 2005/0104578 A1 | 5/2005 | Markus |

* cited by examiner

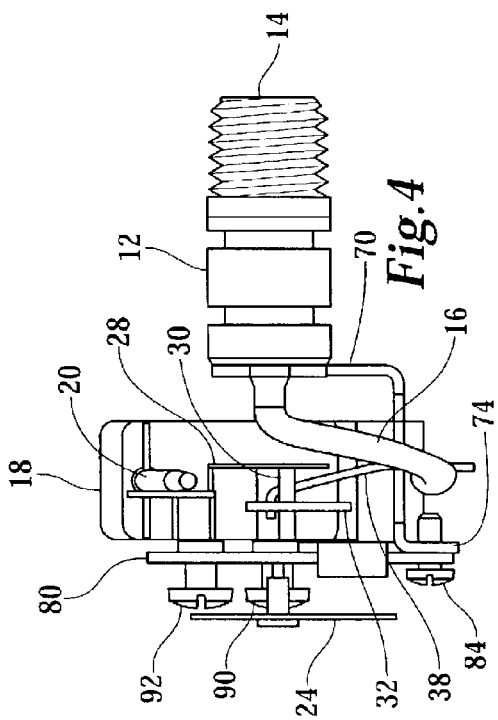
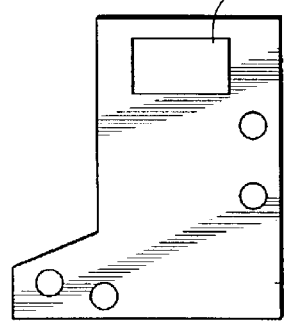
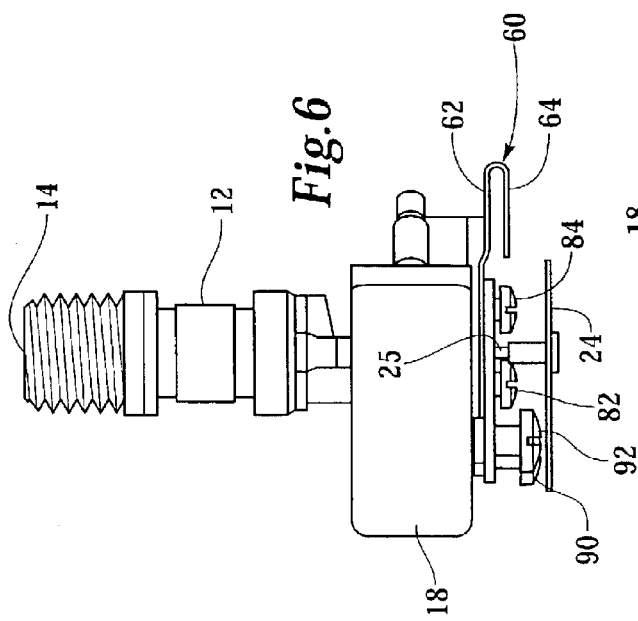
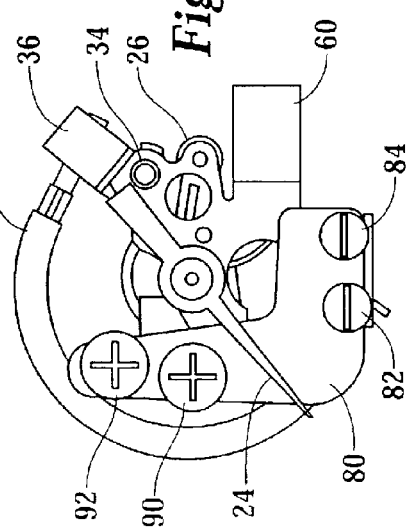

PRESSURE GAUGE HAVING DUAL FUNCTION MOVEMENT PLATE

FIELD OF THE INVENTION

The present invention relates generally to gauges and instruments and in particular to pressure gauges.

BACKGROUND OF THE INVENTION

Pressure gauges are widely utilized in a myriad of different environments for commercial and industrial applications where measuring and indication of fluid pressure values is required. Values of pressure are usually displayed by a pointer in analog form. The primary sensing element of the gauge typically comprises a Bourdon tube having a free end that incurs a predictable displacement in response to pressure changes to which it is exposed. Typically, tube displacement is translated via a movement or amplifier to a rotatable pointer that is displaced opposite a dial of calibrated pressure values. Additional information concerning pressure gauges may be found in U.S. Pat. No. 6,119,525 (Hamma), issued Sep. 19, 2000 and U.S. Pat. No. 4,055,085 (Wetterhorn), issued Oct. 25, 1977, both of which are incorporated herein by reference in their entirety.

SUMMARY OF THE INVENTION

A pressure gauge comprising a stem having an inlet at which pressure is sensed. A Bourdon tube is coupled to the stem and is displaceable in response to pressure changes at the inlet. A movement, comprising a movement plate, conducts displacement of the Bourdon tube to a pointer shaft. A circuit board comprising an inductor is fixed relative to the stem. The movement plate comprises an integral flag connecting the movement to the Bourdon tube and an integral inductive target operatively positioned relative to the inductor. Motion of the movement plate moves the inductive target relative to the inductor and generates eddy currents.

BRIEF DESCRIPTION OF THE DRAWINGS

FIG. 4 illustrates a side elevation view of the pressure gauge of FIG. 2.

FIG. 5 illustrates a front elevation view of the pressure gauge of FIG. 2.

FIG. 6 illustrates a plan view of the pressure gauge of FIG. 2.

FIG. 7 illustrates a plan view of the circuit board of FIG. 1.

DETAILED DESCRIPTION OF PREFERRED EMBODIMENTS

Figure 1:
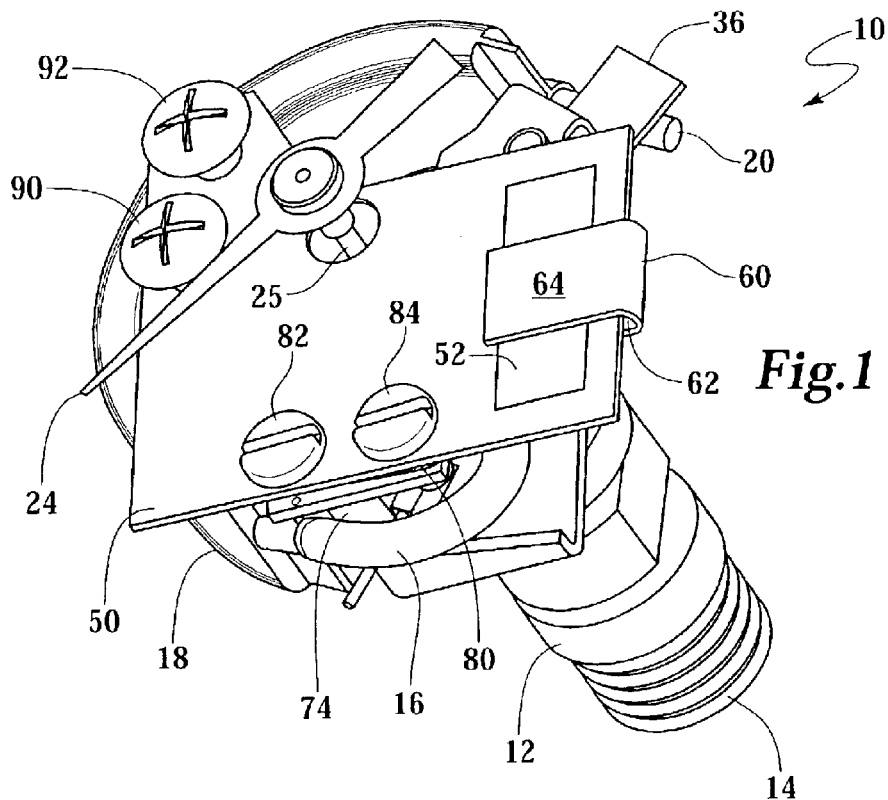
FIG. 1 illustrates a perspective view of a pressure gauge comprising a pointer to produce an analog indication of pressure and a circuit board to produce an electrical indication of pressure.
Figure 2:
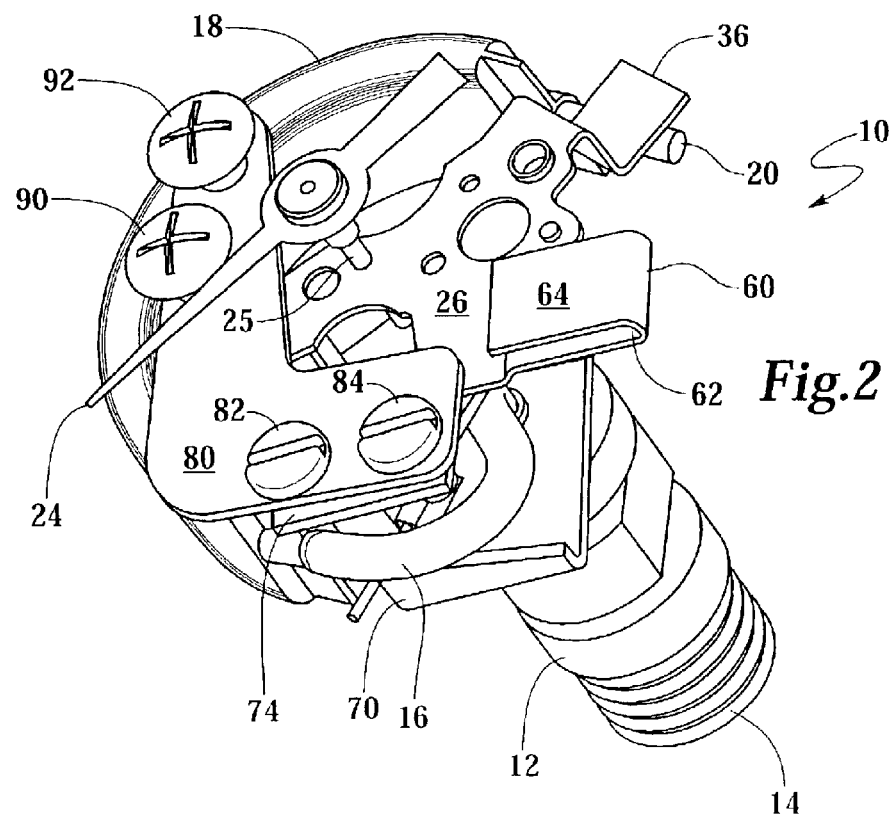
FIG. 2 illustrates a perspective view of the gauge of FIG. 1 with the circuit board removed for clarity to show a movement plate comprising an integral Bourdon-tube-attachment flag and an integral inductive target.
Figure 3:
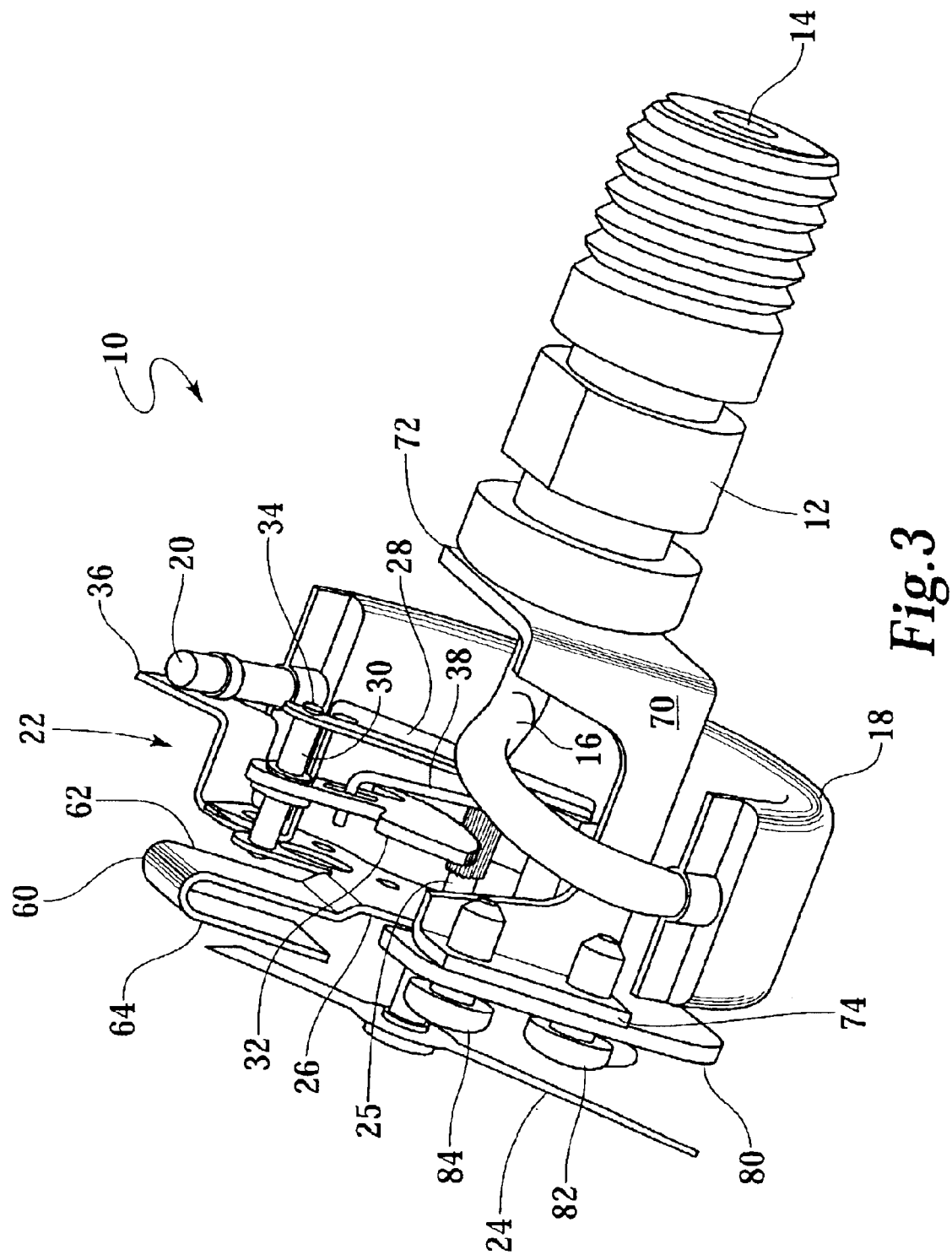
FIG. 3 illustrates a perspective view of the gauge of FIG. 2 viewed from below.

FIG. 1 illustrates a perspective view of a pressure gauge 10 having a socket (stem or pressure fitting) 12 for coupling the gauge 10 to a process to measure pressure associated with the process, e.g., pressure of fluid in a pipe. The socket 12 has an inlet 14 (FIG. 3) at which pressure changes of the process are sensed. Pressure changes at the inlet 14 are communicated via an inlet capillary 16 to a Bourdon tube 18 that is subject to arcuate motion displacement in response to incremental pressure changes at inlet 14.

With reference to FIGS. 2–6, the Bourdon tube 18 comprises a free end (or tip) 20, the displacement of the Bourdon tube tip 20 is conducted through an amplifier to produce an amplified and correlated motion for operating on a pointer 24 on a pointer shaft 25. The pointer 24 provides analog pressure readings against an indicia plate (dial face). The amplifier 22 is conventionally known in the art as a movement and the present invention is not limited to the particular embodiment of the movement 22 described herein. The illustrated movement 22 is a single stage geared movement that comprises a top plate 26, a bottom plate 28, a pinion gear 30 and a segment gear 32, which are joined together via rivets 34. A flag 36 connects the movement 22 to the Bourdon tube tip 20. In the illustrated embodiments, the top plate 26 is formed such that the flag 36 is an integral portion of the top plate 26. The integral flag 36 is welded to the tube tip 20 to connect the movement 22 to the Bourdon tube 18. An adjustment wire block assembly 38 provides the pivot point for the segment gear 32. The movement 22 and the Bourdon tube 18 form an assembly that is welded within a bore (not shown) in the socket (stem, pressure fitting) 12 to form an analog pressure sensor. The pressure sensor is then fastened within a housing containing a graduated indicia plate (dial face) and a protective front window. Then in operation, in response to pressure changes at the inlet 14, the Bourdon tube 18 displaces and causes the pointer 24 to rotate, thereby providing an analog indication of a pressure value.

In combination with the analog indication of pressure, or as an alternative to the analog indication, an electrical indication of pressure may be provided. The pressure gauge 10 is also adapted to generate an output signal in response to pressure changes at the inlet 14. A circuit board 50 comprises a pattern, or multiple patterns, of circuit traces that define an inductor 52 (FIG. 7). Circuitry for inductive sensing of motion changes, be it by traces formed directly on a circuit board or by a discrete inductive element are well known. Details concerning exemplary inductive technology are found in U.S. Pat. No. 4,598,260 (Carr) and U.S. Pat. No. 6,384,596 (Beyer), both of which are incorporated herein by reference in their entirely. These inductive forming traces (inductor 52) are located on the circuit board 50 in a position that allows the inductor 52 to be affected by an inductive target (inductive flag) 60 that moves with movement 22. Moving the inductive target 60 relative to the inductor 52 produces eddy currents. In the illustrated embodiment, the inductive target 60 is integral with the top plate 26 and is formed into a U-shape comprising a pair of sides 62 and 64. Conventional wisdom dictates that the inductive flag should be welded to a standard movement plate. This approach would allow for economies of scale by allowing for use of the standard movement plate in both sensors with and without inductive capabilities. But is has been discovered that forming the movement top plate 26 such that the inductive target 60 is an integral portion of the movement top plate 26 leads to improved sensor performance. As illustrated in FIG. 1, the circuit board 50 is positioned between sides 62 and 64 of the inductive target 60.

Increasing the pressure at inlet 14, i.e., increasing the process pressure, causes Bourdon tube 18 to expand and top plate 26 to rotate counter clockwise (FIGS. 1 and 2) around a polar point (not shown). Inductive target 60 of top plate 26, being attached to top plate 26, is forced to displace (rotate counter clockwise), along with the top plate 26 and the Bourdon tube tip 20. This displacement of the inductive target 60 is relative to the circuit board 50, which is fixed relative to the socket 12, and thus the target 60 is moved relative to the inductor 52. This relative displacement between the target 60 and the inductor 52 causes eddy currents to escape between the inductive traces of the board 50 and the inductive target 60. Preferably, the circuit board 50 includes circuit output means that represent a choice of output signal, e.g., mV ratiometric, 4–20 mA, 0.5–4.5V, or frequency.

Thus, the movement top plate 26 is an integral article (piece-part) that comprises the functionality of an eddy current sensing flag and the functionality of a standard movement plate. By such integration, economies of manufacturing are achieved in terms of unit cost reduction and tool savings. Additionally, performance of the pressure gauge is improved with respect to the unit's electrical signal output because a more perfect, and consistent, location of the sensing flag, from piece to piece, is achieved by virtue of the sensing flag 50 being integrated into the movement plate 26. And economies of scale can be achieved by using a dual function movement plate (e.g., a plate with an integral attachment and an integral inductive target) in both sensors with and without inductive capability since the addition of the target does not impact the performance of the analog sensor.

FIGS. 2–6 illustrate the pressure gauge 10 with the circuit board 50 removed for clarity. The pressure gauge 10 comprises a stamping 70 comprising a proximal end 72 and a distal end 74. The proximal end 72 is welded to the socket 12 and the distal end is amendable to the attachment of a support plate 80. The support plate 80 has two pair of holes. One pair is for the securement of the circuit board 50 and the other for securement of parameter-adjustment screws 90 and 92. The parameter-adjustment screws 90 and 92 allow for adjusting zero and span on the electrical output signal by virtue of an auxiliary pair of coupled inductive traces (not shown) located directly under heads of the parameter-adjustment screws 90 and 92. Moving either screw in or out affects the zero (or null) position of the signal. Moving both screws the same amount either in or out affects the span (or gain) of the signal. The screw holes are surrounded by integral bosses 94 and 96 that improve the integrity of the holding of parameter adjustment screws 90 and 92 against shock and vibration.

The circuit board 50 and the support plant 80 are secured to the distal end 74 of the stamping 70 via screws 82 and 84. One of the holes in the circuit board 50 may be deliberately enlarged to allow rocking of the board 50 to establish the electrical null position. The board 50 is rocked around the other (closely fitting) screw, before fully tightening it, to allow for establishing the electrical null position; then screws 82 and 84 are securely tightened.

In another embodiment of the invention, sensor 18 may be coupled via capillary 16 and socket 12 and in known manner to a gas filled line and bulb assembly (not shown) such that the gas pressure in the remote bulb is responsive to temperature changes at the bulb location. In yet another embodiment, the inductor 52 is integral with the movement top plate 26 and the inductive target flag 60 is fixed relative to the socket 12. In still another embodiment, traces forming the inductor 52 are formed on the movement top plate 26 and on circuit board 50, which is fixed relative to the socket 12. Thus, in a more general embodiment, the gauge comprises an inductor system comprising a first inductor component, e.g., traces or flag, and a second inductor component, e.g., traces or flag, wherein the first component moves relative to the second component in response to displacement of the top movement plate 26.

Use of terms such as first, second, up, below, etc., are for convenience in describing the illustrated embodiments and such use is not intended to limit the variety of embodiments of the invention. Similar features are identified throughout with similar numbers to aid understanding but not to indicate such features are required to be identical among the various embodiments.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An instrument comprising:
   a stem comprising an inlet at which a parameter to be measured is sensed;
   a mechanical transducer producing a displacement in response to changes at the inlet of the measured parameter;
   a movement connected to the mechanical transducer and comprising a movement plate having an integral inductive target, wherein the displacement causes the integral inductive target to move; and
   an inductor operatively positioned relative to the integral inductive target and fixed relative to the stem, wherein movement of the integral inductive target relative to the inductor generates eddy currents indicative of the measured parameter.

2. The instrument of claim 1, comprising a pointer shaft having a pointer mounted thereon, the pointer shaft being coupled to the movement, wherein the movement causes the pointer shaft to rotate in response to the displacement produced by the mechanical transducer.

3. The instrument of claim 2, wherein the mechanical transducer comprises a Bourdon tube.

4. The instrument of claim 3, wherein the movement plate comprises a flag connecting the movement plate to the Bourdon tube.

5. The instrument of claim 1, comprising a circuit board fixed relative to the stem and comprising traces forming the inductor.

* * * * *